United States Patent [19]

Josias et al.

[11] 3,714,421
[45] Jan. 30, 1973

[54] GAS DETECTOR AND ANALYZER

[75] Inventors: Conrad S. Josias; Lloyd D. Bowman, both of Los Angeles, Calif.; James E. Lovelock, Wilts, England

[73] Assignee: Analog Technology Corporation, Pasadena, Calif., by said Lovelock

[22] Filed: May 29, 1969

[21] Appl. No.: 835,290

[52] U.S. Cl......250/43.5 MR, 73/23.1, 250/83.6 FT
[51] Int. Cl..............................................G01n 23/12
[58] Field of Search.........250/43.5 MR, 44, 83.6 FT; 73/23, 23.1

[56] References Cited

UNITED STATES PATENTS

| | | | |
|---|---|---|---|
| 3,298,788 | 1/1967 | Dewar et al. | 73/23 X |
| 3,489,903 | 1/1970 | Robinson | 250/83.6 FT |
| 3,361,908 | 1/1968 | Petitjean et al. | 250/43.5 MR |
| 3,450,877 | 6/1969 | Zimmer | 250/43.5 MR |

OTHER PUBLICATIONS

Ionization Methods for the Analysis of Gases and Vapors, by Lovelock, J. E., from Analytical Chemistry, Vol. 33, No. 2, Feb. 1961, pgs. 162 to 177.

*Primary Examiner*—Archie R. Borchelt
*Attorney*—Golove & Kleinberg

[57] ABSTRACT

A portable, self-contained gas detector and analyzer is disclosed which includes a carrier gas supply, and electrical power supply, a sampling loop and a chromatographic column with an electron-capture detector. A preferred embodiment is adapted to respond to a pre-selected tracer gas. If the tracer is included in a closed system whose integrity is suspect, the detector can first be operated to detect the presence of the tracer and then can signal the rate at which the tracer is being provided to a predetermined, limited volume.

10 Claims, 11 Drawing Figures

PATENTED JAN 30 1973

James E. Lovelock,
Conrad S. Josias,
Lloyd D. Bowman,
INVENTORS.
BY.

GOLOVE & KLEINBERG,
ATTORNEYS.

GAS DETECTOR AND ANALYZER

The present invention relates to the detection and measurement of low concentrations of gases and vapors and, more particularly, to portable, self-contained apparatus that is responsive to the presence of particular gaseous compounds which are used as tracers.

In the prior art, devices have been taught for the qualitative and quantitative analysis of certain classes of organic compounds such as halogenated hydrocarbons. One example of apparatus is shown in the patent to Strange, U.S. Pat. No. 3,009,097. Another was disclosed in U.S. Pat. No. 3,247,375, which issued to James E. Lovelock on Apr. 19, 1966. Lovelock taught improved electron capture detectors which could signal the presence of very low concentrations of several different compounds through appropriate calibrations.

One specific embodiment, illustrated in FIG. 4 of the patent, employed an ionization chamber. An electrometer circuit measured variations in current flowing through the ionization chamber resulting from the capture of free electrons by the compounds to be detected.

In an alternative embodiment, a pulse generator which provided positive pulses of amplitudes between 50 and 150 volts and widths between 0.5 and 10 microseconds was connected across the electrodes of the ionization chamber. The interval between pulses was approximately twice as long as the width of the pulse. The signal output of the electrometer was recorded.

In a paper titled "Electron Absorption Detectors And The Technique For Their Use In Quantitative and Qualitative Analysis By Gas Chromatography," published in Analytic Chemistry, Vol. 35, No. 4, April 1963, p. 474–481, prepared for the Baylor University College of Medicine at Houston, Texas, James E. Lovelock suggested an improvement over the apparatus disclosed in his patent. A pulse generator applied an input to one terminal of the detector and the other terminal of the detector was connected through an appropriate RC network to an electrometer. The pulse generator provided pulses of approximately 50 volts amplitude and widths between 0.5 and 1.0 microseconds. However, the period between successive pulses ranged between 5 and 200 microseconds. In this arrangement, the "sampling pulse" collected substantially all of the free electrons at the "anode," without any significant movement of either positive or negative ions. The pulses were then integrated in the RC network to provide a steady, DC current to the electrometer circuit which, in turn, provided an output to suitable recording devices.

Gas detectors and analyzers have, in the past, been large, bulky, relatively permanent installations requiring a substantial electrical power supply and a substantial source of carrier gas for use with chromatographic systems. Most systems have been designed to work in a laboratory or in a fixed installation where these requirements did not constitute a particular burden.

However, it has been deemed desirable to provide a lightweight, portable, completely self-contained device which can alternatively detect the presence of a preselected tracer gas in an environment by measurement of concentration sensitivity in that environment, or, to determine the rate at which a preselected tracer gas is entering a limited volume, for the purpose of testing the integrity of closed systems.

According to the present invention, there is provided in a small "suitcase" size package, a completely portable, self-contained detection apparatus that is sensitive to the presence of sulphur hexafluoride ($SF_6$) which is a non-radioactive, non-toxic, inert tracer gas. Alternatively, the apparatus could be sensitive to freon, or other gases which have a high affinity for free electrons, for example, the halogen compounds.

The invention includes an improved gas handling sub-system, an improved electrical sub-system for detecting the preselected gas, and an improved test probe that permits the detection of the presence of the tracer in an environment as well as a leak detector for use with systems that are supposed to be closed, that can signal the existence of a leak and within certain limits, the rate of leakage.

The gas handling sub-system includes a self-contained supply of a carrier gas, preferably argon with 10 percent methane ($CH_4$) and a gas path which passes through a filter for contaminants, through a sample-valve system into a chromatographic column and then into an electron-capture detector. For leak detection purposes, provision is made to bypass some of the carrier gas to the probe.

The sampling path includes the sampling probe, a fixed-volume sampling "loop" which communicates with the sampling valve and then to a pump which exhausts to the atmosphere. A flowmeter can be provided in the sampling path and, to enable calibration and certain leak-rate measurements, a bypass with an adjustable restrictor is provided in parallel with the pump.

The electrical sub-system includes an electron-capture detector which is connected to a pulse generator that provides "brief" sampling pulses (approximately 1 microsecond) at a relatively "slow" rate (approximately 10,000 pulses per second). The output of the detector is adjustable biased to null the output of the detector, when carrier gas only is flowing.

The output of the detector is applied to an electrometer-amplifier which is also provided with an adjustable bias, as well. A feedback loop is provided with alternatively selectable paths. In addition to a normal feedback path, a short circuit path is provided for nulling the amplifier, and two integrating paths are provided so that the leak rate can be expressed by a relatively steady state signal at more than one level of sensitivity.

The output of the electrometer amplifier is adequate to drive a meter movement, a recorder instrument, or the output can be applied to a voltage controlled oscillator for generating an audio signal, the frequency of which provides the significant information.

In the most sensitive mode of operation, the carrier gas supply is connected to the carrier gas path. After a reasonable warm-up time, the short-circuit in the feedback loop is connected in order to zero the amplifier. The built-in pump is energized to draw air samples through the probe and the sampling loop.

After setting the instrument for the desired sensitivity, a sampling button is depressed. The sample loop is then included in the carrier gas stream. The probe and pump are directly connected through a bypass path. At the same time, the amplifier may be disable for a predetermined interval of time, during which the oxygen component of the air sample passes through the detector. The amplifier is enabled during the time that the selected tracer gas would be eluted from the column and, if the tracer is present, a meter deflection will occur sometime between 60 and 120 seconds after the sample has been included in the carrier gas path. Should an audio output signal be desired, a basic audio signal can be changed in pitch in proportion to the meter deflection.

If the rate of a "leak" is to be determined as in the following example which is one of several alternative methods, the gas flow paths are slightly modifier. A supply of carrier gas is furnished to the probe. The probe has a resilient collar which can be held securely against the area to be tested. The resilient collar permits a substantially air-tight seal to be achieved. Appropriate sealing materials such a silicon grease can be applied to the resilient collar to improve the integrity of the seal. An alternative method of testing involves placing the vessel under test in a bag or other type of container and sealing the container around the probe and vessel.

The volume of interest is continually being swept by a known volume of carrier gas which is "flushed" into the probe intake and through the sample loop. The sample button is energized and the sample loop is included in the primary carrier gas path. At the appropriate time, the magnitude of either deflection can be related to the rate of leakage, using appropriate calibration charts which have been prepared.

Should it be desired to measure the area of a peak (the area being the most accurate quantitative measurement), one of the alternative "integrator" modes may be used. An integrating capacitor is included in the selected amplifier feedback loop. The oxygen peak is first automatically blanked and then the tracer peak current is integrated across the feedback capacitor. The output voltage is sustained within constraints of amplifier and baseline current drifts. By use of an output recorder, permanent records of integrated peaks may be made, and associated drifts (which would ordinarily make the reading of low-level metered integrations difficult) can be subtracted. Appropriate charts permit conversion of both meter and recorder readings to leak rates.

In its continuous monitoring mode, air is drawn in through the probe by a pump and a fraction of the sample is mixed in with the carrier stream. The mixture of carrier gas and attenuated sample is routed directly to the detector, whose baseline current is reduced by the oxygen component of air. The detection of a tracer component in the air sample further reduces the detector current in such a way that the measured output becomes a slowly varying dc value modulated by the local concentration of tracer gas. This configuration provides comparatively faster analysis, but with less sensitivity.

The novel features which are believed to be characteristic of the invention, both as to organization and method of operation, together with further objects and advantages thereof will be better understood from the following description considered in connection with the accompanying drawings in which several preferred embodiment of the invention are illustrated by way of example. It is to be expressly understood, however, that the drawings are for the purpose of illustration and description only and are not intended as a definition of the limits of the invention.

Figure 6A:
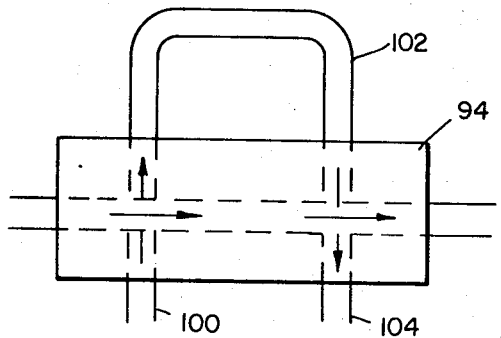
Figure 6B:
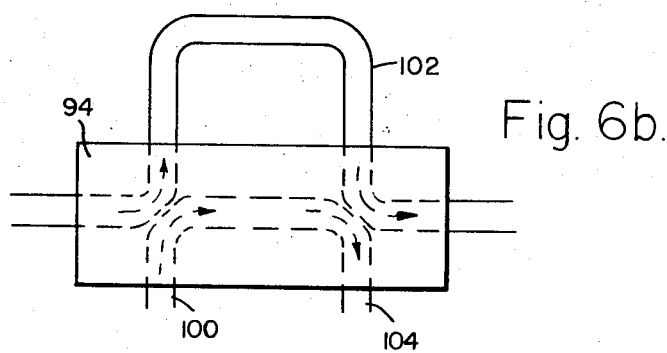
Figure 8A:
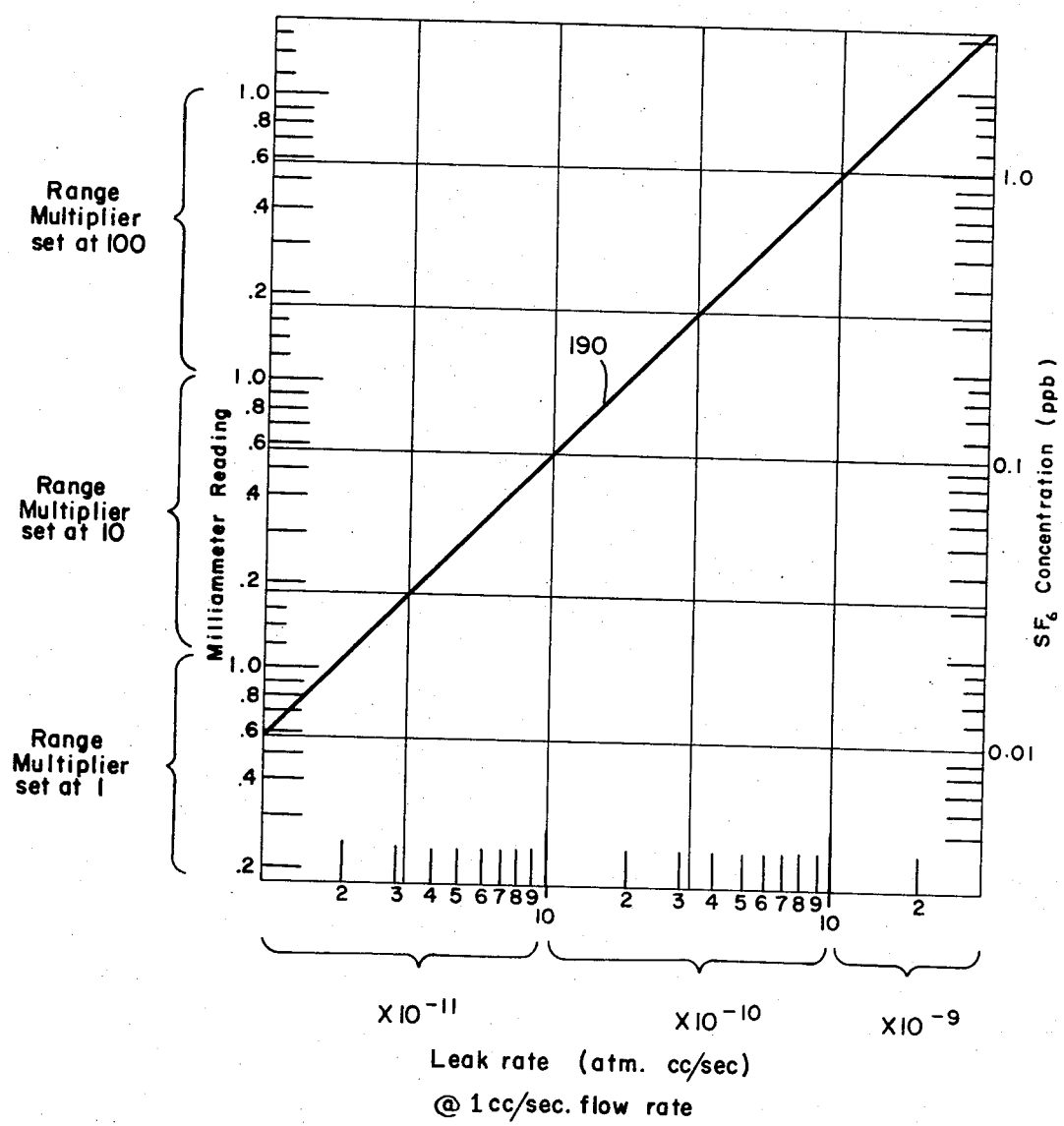
Figure 8B:
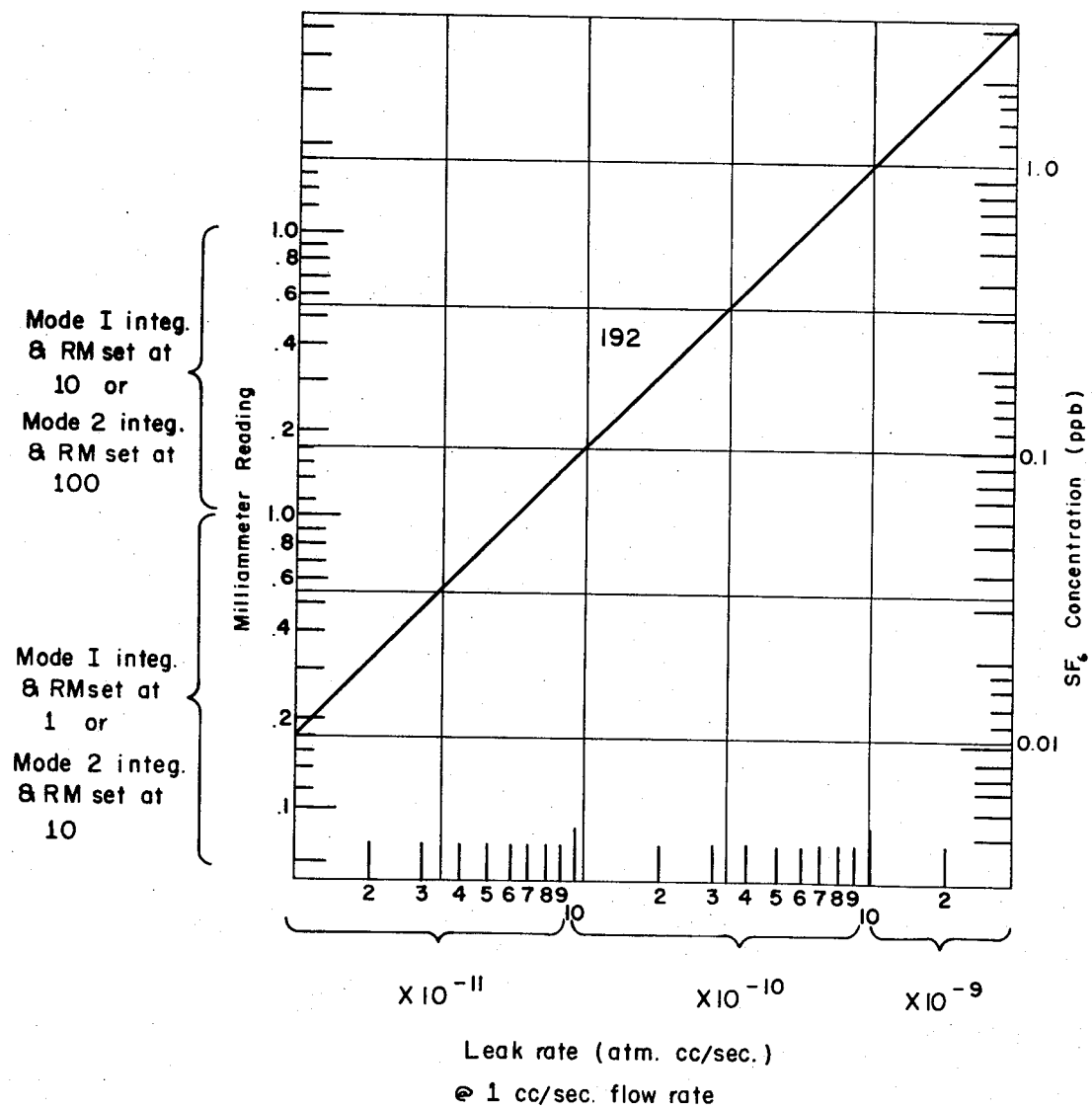
Figure 9:
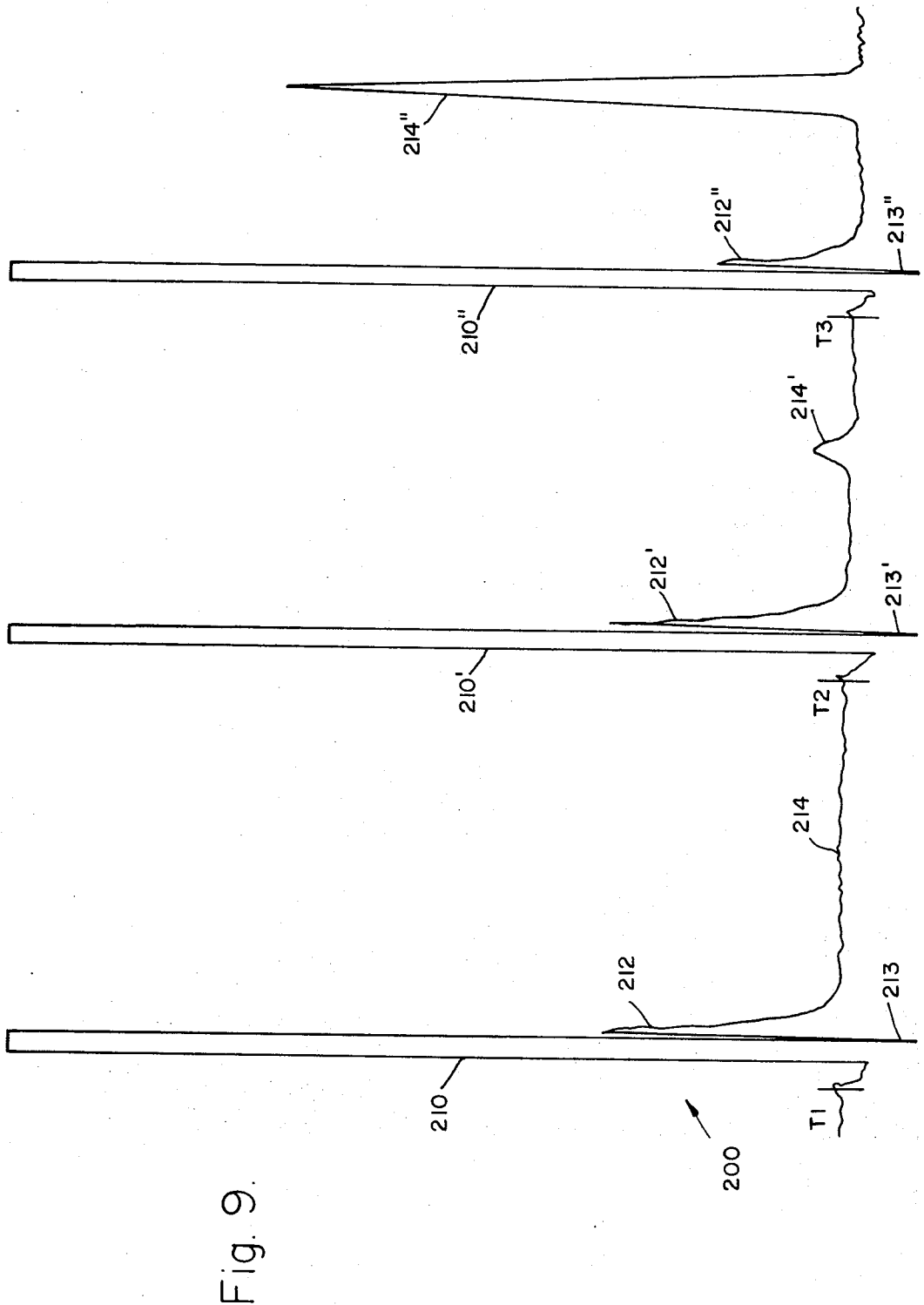

FIG. 6, including FIGS. 6a and 6b, is a partly idealized view of a sampling valve for use with the present invention in both of its alternative configurations;

FIG. 7 is a block diagram of the power supply of the instrument to the present invention;

FIG. 8 including FIGS. 8a and 8b are typical calibration charts for recorder signals; and FIG. 9 is a typical chromatogram derived from the system of the present invention.

Figure 1:
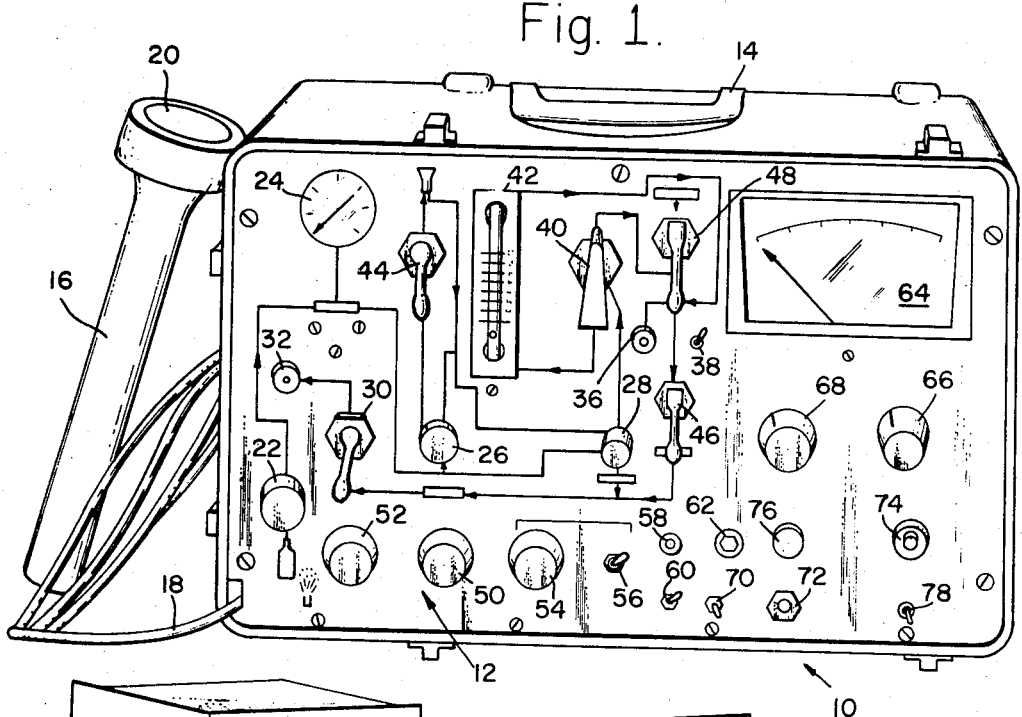
FIG. 1 is a front view of an instrument according to the present invention with the cover removed therefrom.

Turning first to FIG. 1, there is shown a portable, self-contained instrument 10 according to the present invention. A dust cover (not shown) is provided to protect a front panel 12 from the normal hazards of handling and transportation. A carrying handle 14 makes the device easily transportable.

An improved probe assembly 16 is coupled by flexible tubing 18 to the gas-handling sub-system. A pliable, resilient collar 20 is mounted on the probe 16 to enable reasonable gas-tight seals over limited areas of investigation.

On the front panel 12, there are located the various operating controls of both the gas and electrical subsystems as well as appropriate displays by which various quantities can be measured. The various elements of the front panel 12 will be identified here, but their purpose and function will be explained in greater detail in connection with the gas and electrical sub-systems which are described below. A carrier gas valve 22 controls the flow of bottled, carrier gas and a pressure gauge 24 is provided to indicate the current state of the carrier-gas supply.

A probe flow control 26 is provided to divert a limited amount of the carrier gas through the probe assembly 16 for leak-rate measurements. The main flow of carrier gas goes through a sampling valve control 28 which, when energized selectively includes in the carrier gas path, a predetermined volume sample loop through which has been circulating the gas to be tested as explained below. The carrier gas continues through a separating column and an electron-capture detector.

A downstream shut-off valve 30 is provided to isolate the detector and column from the external atmosphere, to which it is normally coupled through a detector vent 32.

The probe 16 normally applies samples of gas through the sample valve and a sample loop to a pump unit 34 (not shown) which is coupled through a pump vent 36 to atmosphere. A pump switch 38 controls the energization of the pump 34. A flow meter control valve 40 selectively applies the sampled gas stream either through a flow meter 42 or through the pump 34 and pump vent 36, to atmosphere. Additional gas subsystem controls are accessible from the back panel, and are identified in connection with the description of FIG. 2 below. A probe flush valve 44 is provided to permit the carrier gas supply to be admitted to the probe assembly 16 for leak rate detection.

In order to permit the continuous sampling mode of operation, a continuous sampling enabling valve 46 is interposed between the pump 34 output and the input to the detector at the output of the chromatographic column. A bypass valve 48 connects the atmosphere through a restrictor, to the intake side of the pump. This alternative intake source is available to prevent overload on the pump in the event that the volumetric flow through the probe is insufficient during modes in which the predominating probe intake is the carrier gas being flushed into the probe and the continuous sampling enable valve 46 is closed.

Various elements of the electrical subsystem are also found on the front panel 12. A mode switch 50 alternatively selects a normal mode, a first integrating mode or a second integrating mode. The mode switch 50 is a three-position switch for that purpose. An amplifier zeroing control 52 and a detector zeroing control 54 are also provided to permit the null balancing required for both normal and integrating modes. A supplemental detector range switch 56 enables a greater range of control for the detector for operation in a continuous sampling mode when the effects of the oxygen in the atmosphere must be compensated.

A telltale lamp 58 signals when the batteries of the self-contained power supply are being recharged. A battery-select switch 60 permits one of two storage batteries that are provided to be connected as the source of power. A reset switch 62 provides a short-circuit feedback loop in the amplifier for nulling purposes. A meter 64 is provided for adjustment, calibration, and test purposes as well as display of the output signal. An appropriate meter zero control 66 is also provided to null a driving amplifier for the meter 64 prior to operation.

A range multiplier switch 68 permits the selection of one of a number of possible sensitivities and also certain limited operating configurations can be chosen. A meter zero position is provided to enable a zeroing of the meter 64 with the meter control 66. A second position permits a check of the selected battery to determine whether sufficient power remains in the battery for operation before recharging is required. Three other positions select sensitivity ranges, based upon the expected concentration of the tracer gas. An $O_2$ inhibit switch 70 is provided to selectively include an amplifier disabling circuit that is energized when the sample switch 28 is closed so that the detector and amplifier circuits will not respond to the detection of oxygen gas, which also has a substantial electron capture capability in its normal concentrations. By placing the $O_2$ inhibit switch 70 in the "off" position, this internal circuitry is disabled, and the instrument will respond to oxygen peaks in the chromatogram, as well as the peaks attributable to selected tracer gases.

Appropriate outputs are provided including a headset jack 72 and a recorder jack 74. A volume control 76 adjusts the volume of the signal which is applied to the headset. A power, on-off switch 78 enables the operation of the electrical circuit.

Figure 2:
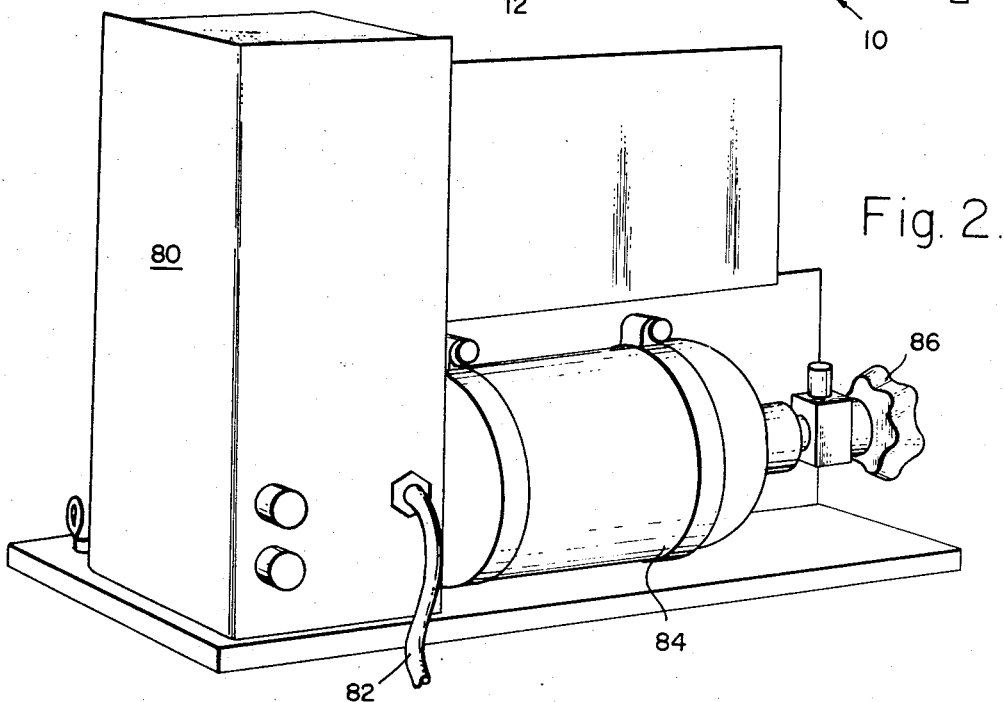
FIG. 2 is a view of the controls on the back of the instrument of FIG. 1.

Turning next to FIG. 2, the "back" of the instrument, includes a recharging unit 80 with an appropriate power cord 82 that is adapted to be connected to a source of 60-cycle 110-volt AC voltage. A small "bottle" 84 of carrier gas is installed in an appropriate mounting bracket. The carrier gas control knob 22 and the carrier gas pressure gauge 24 on the front panel are appropriately interconnected to the gas bottle 84. A pressure regulator (not shown) limits the rate of flow of the carrier gas. A gas turn on valve 86 provides the basic control of the gas supply. A continuous flow adjust valve 88 regulates the relative amounts of gas going to the vent 36 and the detector 98 through the continuous sample enabling valve 46.

Figure 3:
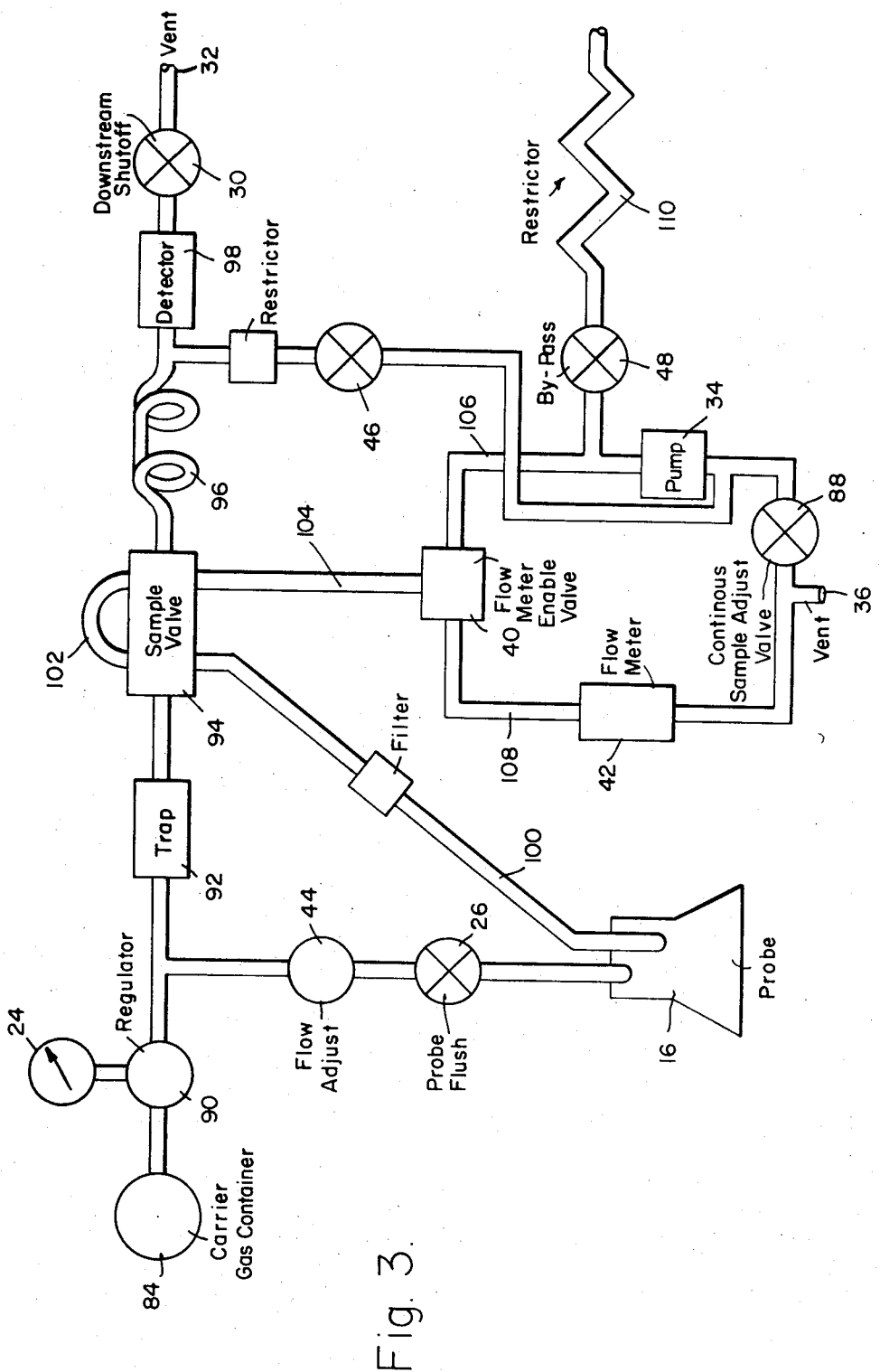
FIG. 3 is a diagram of the gas handling system of the present invention.

Turning next to FIG. 3, there is shown in substantially block form, the gas-handling subsystem of the detector and analyzer of the present invention. As can be seen, the carrier gas container 84 is connected through a regulator 80 and the available pressure is monitored by the pressure gauge 24.

The carrier gas normally proceeds through a trap 92 which removes contaminants, and then into a sample valve 94. The sample valve 94 (shown in greater detail in FIG. 7 below) normally connects the carrier gas supply to a chromatographic column 96 and into an electron capture detector 98. The downstream shut-off 30 applies the gas flow from the detector 98 to the detector vent 32. For one mode of leak-rate detection, an alternate carrier gas path is provided through the probe flush valve 44 and the adjustable, probe flow restriction 26 into the probe 16.

The sampled gas path includes an intake conduit 100 from the probe 16 which is connected to the sample valve 94. Normally, the sample valve 94 carries the intake from the probe 16 to a sampling loop 102 which is connected to a sampled gas outlet line 104.

The flow meter enable valve 40 alternatively connects the sampled gas outlet line 104 to a first path 106 which includes a pump 34 and the pump vent 36, or to a second, parallel path 108, which includes the flow meter 42. The parallel paths 104, 106 are both connected to the vent 36. The first path 106 also includes an alternative input path from atmosphere through intake bypass valve 48 and a restrictor 110, which is open to atmosphere.

In the normal, gas detection mode, the Probe Flush valve 42 is closed and the Flow Meter Enable valve 40 couples the first parallel path 106 to the sampled gas outlet path 104. The bypass valve 48 may be opened to provide a supplementary flow of air to the pump 34, if it is deemed undesirable to draw all of the pump intake through the probe 16.

In alternative configurations, the Flow Meter Enable valve 40 directs the flow of sampled gas through the Flow Meter 42 in the second parallel path 108. During leak rate measurements or system calibration measurements, the rate of gas flow is important. When the carrier gas is applied to the probe 16 through the Probe Flush valve 44, the rate of flow can be monitored on the flow meter 42 and the flow can be modified by the flow adjustment valve 26. This configuration will also be used in the special case of calibrating the instrument through the use of a commercially available "calibrated leak source." In these modes, the bypass valve 48 is normally closed.

When the sample push button 28 is operated, the sample valve 94 configuration changes to include the sample loop 102 into the main carrier gas stream and to provide a bypass for the sampled gas flow from the probe 16 to the sampled gas outlet 104. The chromatographic column 96 operates to separate the various component elements mixed in the carrier gas stream. The elution time of each component differs depending upon the chemical nature of the component. The component gases thus separated are then successively applied to the electron capture detector 98.

In the continuous sampling mode, the probe flush valve 44 is closed, the bypass valve 48 is closed, the continuous sampling enabling valve 46 is opened and the pump 34 is energized. A large volume of air is drawn through the probe 16 through the normal, sampled gas flow path. Carrier gas is continuously applied through the sample valve 94 and the chromatographic column 96 to the detector 98. Part of the pump 34 output is fed back, through an alternative flow path, through the continuous sample valve 46 directly into the carrier gas stream between the column 96 and the detector 98. The volume of sampled air applied to the detector 98 is determined primarily by the setting of the continuous sample adjust valve 88, which passes substantially all the pump 34 output to atmosphere through pump vent 36. By decreasing the volume of sampled air through the continuous sample adjust valve 88, the volume through the detector 98 can be increased.

Figure 4:
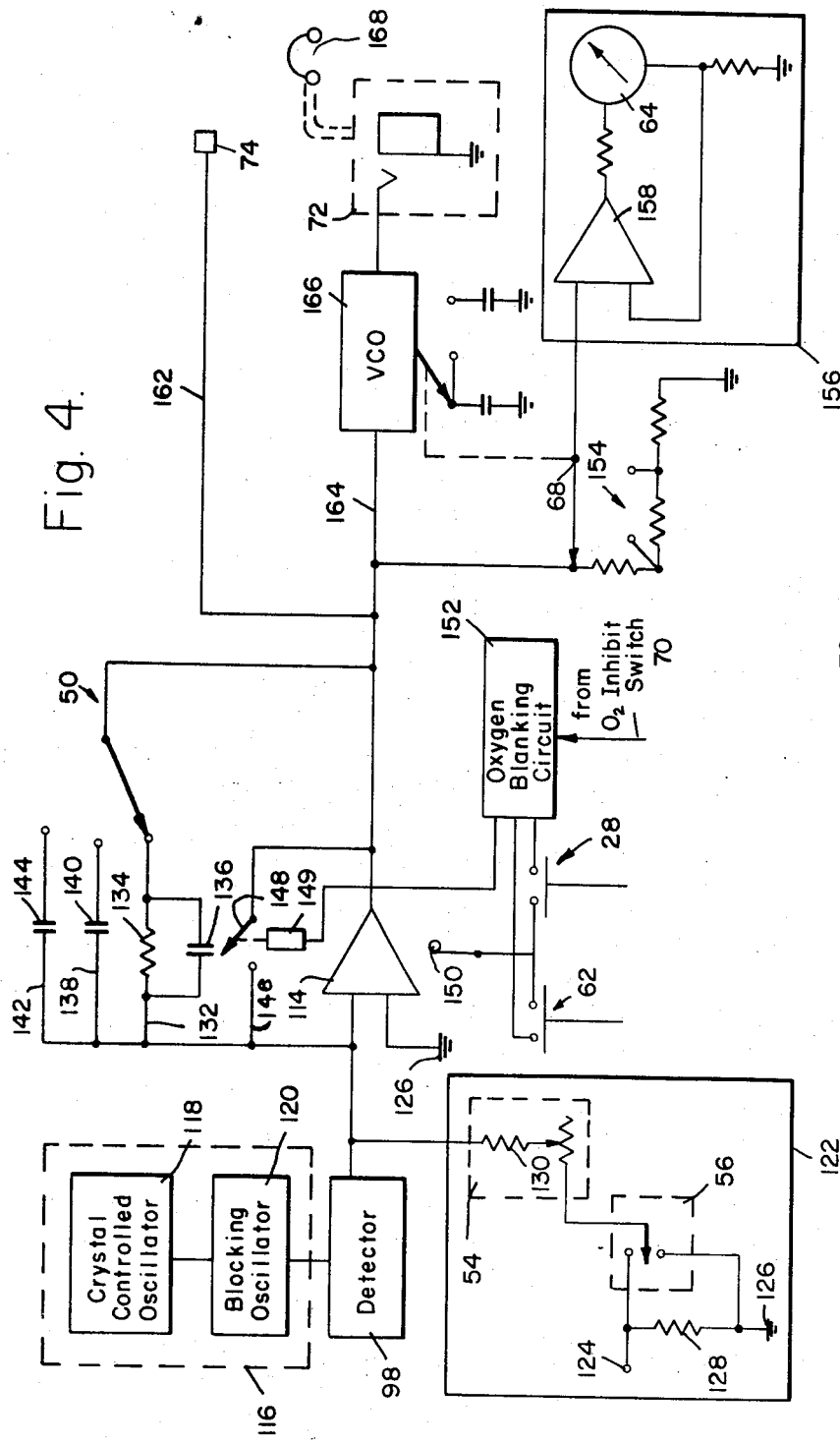
FIG. 4 is a block diagram of the electrical system of the present invention.

Turning next to FIG. 4, there is shown in partly block, partly schematic diagram, the electronic subsystem 112 of the instrument of the present invention. An electron capture detector 98, such as is shown in the above-mentioned patent to Lovelock, U.S. Pat. No. 3,247,375, or as illustrated in FIG. 12 of the Lovelock publication at page 171 of Vol. 33 of *Analytical Chemistry*, for February, 1961, may be used.

In the preferred embodiment, however, a cylindrical detector is provided, the inside surface of which is lined with a tritium foil, which is a radioisotope and a beta emitter. The inside surface can be considered the cathode of the detector and an appropriate connection is made to an electrometer amplifier 114 or power supply 116. A concentric, coaxial, needle-like probe, electrically isolated from the cathode is placed inside the cylinder and is connected as the anode of the detector. The flow of gas through the detector is in the axial direction. Obviously, the connections can be reversed in appropriate circumstances, with probe functioning as the cathode.

The detector anode is connected to the power supply circuit 114 which includes a crystal-controlled oscillator 118 and a blocking oscillator 120.

In has been found that the electron capture detector envisaged by Locklock, supra, is frequently sensitive. Accordingly, errors can be introduced by frequency drifts or by other instabilities of the pulse generating circuitry. Accordingly, a highly stable pulse source is provided in the present invention. In the preferred embodiment, a crystal controlled oscillator 118 is utilized, which can be held to frequency stabilities greater than one part in $10^8$. It is believed that such an extremely stable pulse source is essential for the reliable operation of the gas detector of the present invention.

In the preferred embodiment, the power supply circuit 116 is adjusted to provide relatively positive pulses approximately 30 volts in magnitude and approximately 3 microseconds in duration at 100 microsecond intervals. In one gas detector that was built according to the present invention, a 100 microsecond pulse interval was used with satisfactory results.

The cathode surface radiates a steady, uniform supply of electrons and also produce additional electrons in the carrier gas all of which "flow" through the carrier gas environment in the detection chamber to the anode, so long as a potential gradient exists as between these electrodes. In the pulsed mode of operation, the electrons reach the anode *only* during the existence of the pulse, at which time the potential gradient exists.

By appropriate filtering circuits, a steady-state, quiescent current is provided from the detector 98 to the electrometer amplifier 114. In the normal condition, this current is balanced by a baseline adjustment circuit 122 which includes the detector zeroing potentiometer 54 adapted to connect between a source of potential 124 of opposite polarity to that of the pulsed power supply 116 and a source of common reference potential 126. A dropping resistor 128 of approximately the same resistance as the maximum potentiometer 54 resistance is connected between the sources 124, 126. A large resistor 130 in series with the potentiometer tap then applies a "baseline compensating" current to the detector 98 so that the input to the electrometer amplifier 114 is effectively zeroed.

It is then apparent that whenever pure carrier gas is flowing through the detector 98, any electrical current that flows will be equalled and balanced by the setting of the Baseline Adjustment circuit 122 and that a zero input will be applied to the electrometer amplifier 114. Similarly, in the continuous sampling mode, the baseline current can be increased to balance the additional current from the normal atmosphere component that is added to the carrier gas stream.

Whenever a tracer gas, such as $SF_6$, or other electron capturing compound is present in the carrier gas stream, some of the free electrons will be captured and the average current produced in the detector 98 will be correspondingly reduced. It is this incremental current (which is proportional to the concentration of the electron absorbing compound) that is amplified in the electrometer amplifier 114 and, as amplified, provides the signal output representing the presence of additional electron capturing compounds in the carrier gas stream.

The mode select switch 50 of the front panel selectively includes one of three alternate feedback paths between the output and the input of the electrometer amplifier 114. A first, or normal feedback path 132 includes a resistor 134, capacitor 136 in parallel combination to provide a predetermined transfer impedance and time constant. The magnitude of the feedback resistor 134 determines the amplification of the signal.

A second or "Integrate 1" feedback path 138 includes a first integrating capacitor 140. A third path or Integrate 2 feedback path 142 includes a second integrating capacitor 144. The integrating capacitors permit charge storage so that the current in the tracer peak may be integrated and stored for a brief period of time. This optional mode provides a quantitative measurement unaffected by the form factor of the peak (i.e., it is the total absorbed charge that is measured, not the rate of charge absorption, as measured in the normal linear mode).

In a typical instrument embodying the present invention, the first integrating capacitor 140 had a capacitance value that differed from the second integrating capacitor 144 by a factor of 10, thereby furnishing two sensitivity ranges that differed by an order of magnitude.

A fourth or "short circuit" feedback path 146 is also provided. The fourth path 146 has a relay control switch 148 interposed therein. The fourth path 146 is used for adjusting the amplifier and/or the baseline adjustment circuit and is also utilized in the oxygen "-blanking" circuit. The switch 148 is controlled by a relay 149 that is alternatively energized by the Reset button 62 or by the Sampling switch 28.

The Reset button 62 connects the relay 149 drive coil directly to a source of potential 150. The Sampling switch 28 triggers an Oxygen Blanking Circuit 152 which connects the relay 148 drive coil to the source of potential 150. The Blanking circuit 152 includes a more or less, conventional, one-shot-type circuit that responds to an input impulse to provide an output impulse of predetermined duration and magnitude.

The Oxygen Blanking Circuit 152, in order to operate, must be enabled by the $O_2$ inhibit switch 70 being in the "ON" position. It will be noted, that by energizing the relay 148 and closing the short circuit loop 146, any charge that may have been stored in the integrating capacitors 144, 140, if in one of the Integrate modes, will be "dumped." The reset switch 62 can therefore be used to "zero" the system output.

An output divider 154 is connected to the Range switch 68 to provide alternative outputs of varying potential to a meter circuit 156. The proper range setting will provide a suitably limited output to the meter circuit 156. The meter circuit 156 includes an amplifier 158 and the meter 64 which is displayed on the front panel 12.

Alternative outputs are provided directly on a first output line 162 which is adapted to be connected to an external graphic recorder through the output terminal 74, and on a second output line 164 which is connected to a voltage-controlled oscillator 166. The voltage controlled oscillator 166 is adapted to provide an audio-frequency signal to a headset 168 through the output jack 72 at a first frequency corresponding to a null or zero output. Any increase in the output frequency is then a function of the magnitude of the electrometer amplifier 114 output signal, and permits operation of the device on an audio basis.

Figure 5:
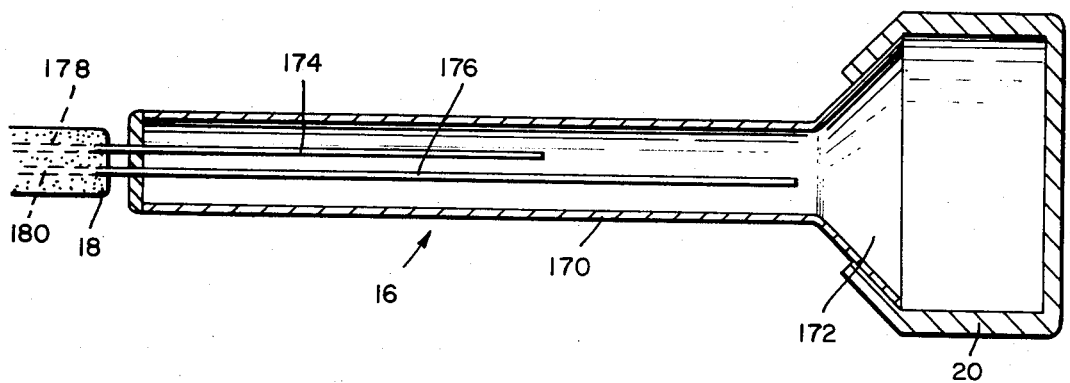
FIG. 5 is a side sectional view of an improved probe according to the present invention.

Turning next to FIG. 5, there is shown a sectional view of an improved probe 16 adapted for use in the present invention. The improved probe 16 includes an elongated cylindrical shell 170 that is flared at an open end to a conical shape 172. The pliable resilient collar 20 fits snugly on the conical portion 172 and is intended to provide a substantially gas tight seal when held against a surface whose integrity is suspect.

Within the cylindrical portion of the probe 16 are a pair of tubes. A first tube 174 is coupled to the carrier gas supply and provides flow of carrier gas to operate in the Leak Rate Detection mode. A second tube 176 is connected to the sampling valve 92 and is the intake to the sampling system. The flexible tube 18 includes a first passage 178 which communicates with the first tube 174, a second passage 180 that communicates with the second tube 176.

In FIG. 6, including FIGS. 6a and 6b, there are shown in diagrammatic form, the flow paths provided by the sampling valve. In FIG. 6a, the valve is in its normal, non-sampling configuration and the carrier gas path goes through the valve 94 without interruption. The sample gas path proceeds from the intake conduit 100 through the sampling loop 102 to the sampled gas outlet line 104.

When the sampling valve 94 is actuated to acquire a sample for detection and analysis, the carrier gas path is re-routed, as shown, in FIG. 6b through the sampling loop 102. The sampled gas path then leads directly from the input conduit 100 to the sampled gas output line 104, through the valve 94. Yet other valves can be devised which will accomplished the desired results, and FIG. 6 is to be deemed illustrative, only.

FIG. 7 is a block diagram of the portable power supply portion of the preferred embodiment of the present invention, and includes a normal electrical plug 182 adapted to be connected to a source of AC power. The battery recharger 80 is connected to the plug 182 and, through appropriate switches, is alternatively connected to a first or second battery 184, 186. The battery select switch 60, connects one of the batteries as a source of power to a static inverter 188 which serves as the basic, DC power supply for the circuits of FIG. 4. The supply is operable in four modes as indicated in the table below.

| Recharger (80) | Battery | Power switch (78) | Instrument operation |
|---|---|---|---|
| off | on | on | normal |
| on | on | on | normal |
| on | on | off | recharge |
| on | off | on | normal |

Turning next to FIG. 8 there are shown typical calibration charts for use with the apparatus of the present invention. In FIG. 8(a) utilizing the calibration curve 190, leak rate can be measured directly from the response of the output meter 64 when set, for example, at a predetermined range (range 10). A signal of 0.6 mA would correspond to an $SF_6$ concentration of 0.1 ppb and a leak rate of $1 \times 10^{-10}$ Atm. cc/scc.

With FIG. 8(b), using the calibration curve 192, the identical concentration and leak rate would correspond to a reading of 0.18 mA in the Integrate 1 mode, or a reading of 118 mA in the Integrate 2 mode but in the next higher range (range 100). It is clear that still other conversions are possible and that other tables, charts and graphs can be devised.

Finally, in FIG. 9, there is shown a typical chromatogram 200 that may be produced by the instrument, operating in the normal mode with the $O_2$ blanking circuit disconnected. If the sample valve is energized at time T1, thereby including the sample loop in the carrier gas stream, approximately ten seconds later, the first peak 210 representing oxygen, will be noted, which generally will drive the meter off scale because of the relatively high concentration of oxygen in any atmosphere sample. A secondary oxygen peak 212 may be produced by a minute valving discharge after the initial sample insertion. The undershot 213 is a common saturation overload effect for electron capture detectors generally. Approximately 60 seconds later, a pulse 213 representing $SF_6$ may be encountered.

With a second sampling, at $T_2$, the oxygen peaks 210' and 212' appear, substantially of the same amplitude. However, a higher $SF_6$ peak 214' is noted, indicating a relatively higher concentration of $SF_6$. In the sampling interval initiated at $T_3$, the $SF_6$ peak 214'' is of substantial magnitude, signifying a substantial concentration of $sF_6$ in the vicinity of the probe.

We claim:

1. In a portable, self contained gas detector for signalling the presence of electron capturing compounds in excess of predetermined threshold amount including
   a portable, self contained source of electrical power,
   a portable supply of carrier gas, and
   means for introducing limited amounts of a gaseous atmosphere under test into a present flow of carrier gas, circuits for detecting and signalling the presence of electron capturing compounds, comprising in combination:
   a. a precision, crystal controlled oscillator power supply, coupled to the electrical power source for applying precise increments of electrical energy at a predetermined rate;
   b. an electron capture detector having first and second electrodes, one of said electrodes including a radioactive source for ionizing gases passing therethrough;
   c. means coupling one of said detector electrodes to said power supply, for periodically creating a potential gradient as between the electrodes, at the predetermined rate;
   d. baseline current supply means coupled to the other of said detector electrodes, adjustable to provide a biasing current sufficient to equal the current as between the electrodes in the presence of an applied reference carrier gas mixture; and
   e. electrometer amplifier means, connected to said other of said detector electrodes for amplifying any electrical output therefrom,
   whereby any change in the electron capturing properties of the gas mixture applied to said detector produces an amplified output signal at said amplifier means.

2. Apparatus of claim 1, above, wherein said electrometer amplifier means includes a first feedback loop having a parallel combination of resistance and capacitance for providing gain to said amplifier means.

3. Apparatus of claim 1, above, wherein said electrometer amplifier means include a short circuit feedback loop, for adjusting said amplifier means in the absence of a signal input from said electron capture detector.

4. Apparatus of claim 1, above, wherein said electrometer amplifier means include an integrating feedback loop for providing a continuous output signal representing an averaged, applied electron capture detector output signal.

5. Apparatus of claim 1, above, further including means coupling said electrometer amplifier means to a meter for visible display.

6. Apparatus of claim 1, above, further including means coupling said electrometer amplifier means to a recorder to provide a graphic record.

7. Apparatus of claim 1, above, further including means coupling said electrometer amplifier means to a voltage controlled audio oscillator to provide an audible signal corresponding to said detector output.

8. Apparatus as in claim 1, above, wherein said power supply is crystal controlled to stabilities greater than one part in $10^7$.

9. Apparatus as in claim 1, above, wherein said power supply pulses are of approximately 3 $\mu$sec duration at 100 $\mu$sec intervals.

10. A portable, self-contained gas detector for signalling the presence of electron capturing compounds in excess of predetermined threshold amounts comprising in combination:
   a. a portable, self-contained source of electrical power;
   b. a portable supply of carrier gas;
   c. mixing means coupled to a source of a gaseous atmosphere under test and said supply of carrier gas for introducing limited amounts of the gaseous atmosphere under test into a present flow of carrier gas;
   d. separating means connected to said mixing means, including a chromatographic column for selectively delaying the passage therethrough of the constituents of the output of said mixing means;
   e. an electron capture detector adapted to be connected to said source of electrical power and said chromatographic column for receiving successively the constituents of the mixture of carrier and test atmosphere gases and for signalling as to each constituent the electron capturing capability, relative to a predetermined threshold based on a selected gaseous mixture; and
   f. electrometer amplifier means coupled to receive the output of said electron capture detector for amplifying the output signals thereof, said electrometer amplifier means including blanking circuit means, coupled to said electrometer amplifier means, for disabling said amplifier means for a selected time interval,
   whereby electron capture detector output signals corresponding to the presence of atmospheric oxygen in said electron capture detector are suppressed to permit subsequent generation of lesser magnitude signals representing the presence of other electron capturing compounds in limited quantities.

* * * * *